US008180750B2

(12) United States Patent
Wilmering et al.

(10) Patent No.: US 8,180,750 B2
(45) Date of Patent: May 15, 2012

(54) SUPPORT MODEL INTEGRATION SYSTEM AND METHOD

(75) Inventors: Timothy J. Wilmering, Chesterfield, MO (US); Joseph R. Herrmann, Baldwin, MO (US); Stanley C. Ofsthun, O'Fallon, MO (US); Kenneth D. Bunch, Troy, IL (US); Donald L. Gartner, Manchester, MD (US); John G. Wilson, St. Louis, MO (US); Man-Kit Au, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 996 days.

(21) Appl. No.: 11/686,089

(22) Filed: Mar. 14, 2007

(65) Prior Publication Data

US 2008/0228521 A1 Sep. 18, 2008

(51) Int. Cl.
*G06F 7/00* (2006.01)
(52) U.S. Cl. ........ 707/705; 707/602; 707/708; 707/802; 715/200
(58) Field of Classification Search .......... 707/708, 707/705
See application file for complete search history.

(56) References Cited

U.S. PATENT DOCUMENTS

| 6,691,007 | B2 | 2/2004 | Haugse et al. | |
|---|---|---|---|---|
| 2002/0188527 | A1* | 12/2002 | Dillard et al. | 705/27 |
| 2006/0218563 | A1* | 9/2006 | Grinstein et al. | 719/328 |
| 2007/0106982 | A1* | 5/2007 | Dalal et al. | 717/128 |

FOREIGN PATENT DOCUMENTS

| EP | 0 407 179 | 1/1991 |
|---|---|---|
| GB | 2 021 261 | 11/1979 |
| WO | WO 03/091682 | 11/2003 |

OTHER PUBLICATIONS

White, Edward V. "Progress in Structural Management for Aerospace Vehicles; Smart Structures and Systems", Boeing—Phatom Works; slide show presentation; Mar. 27-29, 2001.
Trego, Angela; Akdeniz, Aydin; Haugse, Eric. "Structural Health Management Technology Implementation on Commercial Airplanes"; The Seventh Joint DoD/FAA/NASA Conference on Aging Aircraft, New Orleans, LA, slide show presentation; Sep. 8-11, 2003.

* cited by examiner

*Primary Examiner* — Charles Rones
*Assistant Examiner* — Fazlul Quader
(74) *Attorney, Agent, or Firm* — Harness, Dickey & Pierce, P.L.C.

(57) ABSTRACT

A real time health management analytical system and method that enables a plurality of plug-in tools and extension tools to be interfaced with a central database, and for enabling information to be published to the database from each of the client tools, as well as data to be read from the database by each of the client tools. The system makes use of an engineering model views module that provides a syntactic and semantic interface between the client tools and the central database so that health management data communicated to the client tools is presented in accordance with a specific view required by each specific client tool. An integrated support information model (ISIM) module is interposed between the data base and the engineering model views module, and forms a specification (e.g., an ontology) for all health domain information available for use by the client tools.

15 Claims, 6 Drawing Sheets

SUPPORT MODEL INTEGRATION SYSTEM AND METHOD

FIELD

The present disclosure relates to systems for engineering analysis and design of health management and monitoring systems for use in monitoring and managing the health of an information system, and more particularly to a system and method that enables the storage and retrieval of health management system and design data for analytical use by various disciplines.

BACKGROUND

The statements in this section merely provide background information related to the present disclosure and may not constitute prior art.

Improved performance of real time system Health Management (HM) and maintenance functions is becoming a primary design goal of complex systems. Legacy approaches to system design, which focused primarily on minimizing initial acquisition costs, have been generally inadequate to address availability-driven design (i.e., design approaches focused on the relative availability of the system for use based on its operational health). While tools that support availability modeling are not new, traditional acquisition processes have not generally emphasized their importance, and attempts to include availability as a primary design metric have often met with resistance.

Similarly, although the application of Integrated Diagnostics (ID) processes has been advocated in some contractor circles (e.g., U.S. Department of Defense) for nearly two decades, such efforts to guide the integration and verification of system diagnostic requirements across levels of indenture and maintenance have also failed to become core elements of system development.

Finally, even when a legacy program has been given a mandate for supportability improvement, traditional organizations, tools and processes have often been set up for less than optimal performance. Internal engineering silos, conflicting organizational interests, a lack of reusable technologies and processes that tend to be disjointed over the product life cycle have all contributed to inefficiencies that have increased development costs and thus further hampered supportability efforts. For example, an accurate understanding of failure propagation is required for many traditional reliability, testability, maintainability, and safety engineering analyses, at both contractor and supplier sites. Historically, each discipline has performed its own independent analysis of system health characteristics, using independent tools, processes and engineering assumptions. This has proven to be neither consistent nor affordable.

All of these historical shortcomings are exacerbated by increasing system complexity. Historically, HM capabilities have been developed in an ad hoc manner, and have not performed up to the expectations of those responsible for the system design/implementation. Therefore, disciplined approaches are required which leverage and integrate traditional engineering analyses in support of a coherent and traceable HM development process that strives to maximize metrics typically utilized as success criteria for system health and life cycle support issues. An integrated model-driven approach provides a structured means for potentially achieving such improvements.

A common way to represent system behavior is to create a model of that behavior. Modeling approaches vary considerably—their usefulness is proportional to the degree to which they can represent interesting aspects of system behavior in a way that reduces or abstracts the complexities of collateral behavior. There are many categories of models; mental, physical, verbal, etc. In engineering applications, both qualitative (descriptive) and quantitative (mathematical) models, which may take various forms (e.g., text, spreadsheets, graphical representations, static or dynamic networks, etc), are often employed. In general, models support analysis of important aspects of system behavior and enable dynamic views of that behavior via calculation, visualization, simulation, etc. Correctly designed models allow engineers and analysts to draw conclusions and predictions of system behavior in ways otherwise unattainable.

The true power of model-based approaches to system design and analysis would be realized if synergies between system models could be discovered and realized. Such discoveries would enable the outcome of one analysis to serve as the basis or input for another. With such an approach, significant gains in the overall accuracy, efficiency and traceability of analytical design activities could be realized. Of course, a proliferation of models can introduce issues of complexity, data redundancy and management, and the like. Techniques for model integration and reuse of supporting engineering data would be required in order to maximize the utility and benefits to be gained from a model-driven approach to system design.

SUMMARY

The present disclosure relates to a support model integration system and method that enables various forms of health management (HM) analytical tools to be integrated in a manner such that information from the tools can be published to a database so that an aggregated information store is created, or information is obtained from a database and presented in accordance with an engineering view representation required by a particular tool.

In one specific implementation the system includes a database for holding health management data usable by a number of different analytical tools, which tools may generally be referred to as "client" tools. At least one client tool may be used by a user to communicate with the system. The client tool is able to publish information to a database of the system or request information from the database. An engineering model views module in communication with the client module provides a syntactic and semantic interface between the client tool and the database. In this manner, data can be communicated to the client tool in accordance with a specific view required by the client tool. The view restricts each client tool's view of the overall system to just that information that is required by the client tool. An integrated support semantic information model is interposed between the database and the engineering model views module, and forms an ontology for all health domain information stored in the database.

In one implementation a method is provided that involves forming a database for holding health management data useable by various client tools. A syntactic and semantic interface is formed between the client tool and the database so the data communicated to the client tool from the database is presented in accordance with a specific syntactic and semantic framework being used by the client module. An integrated support information model is formed to communicate with the syntactic and semantic interface module and the database. The integrated support information model represents an ontology for all health domain information available for use by the client tool that is stored in the database.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
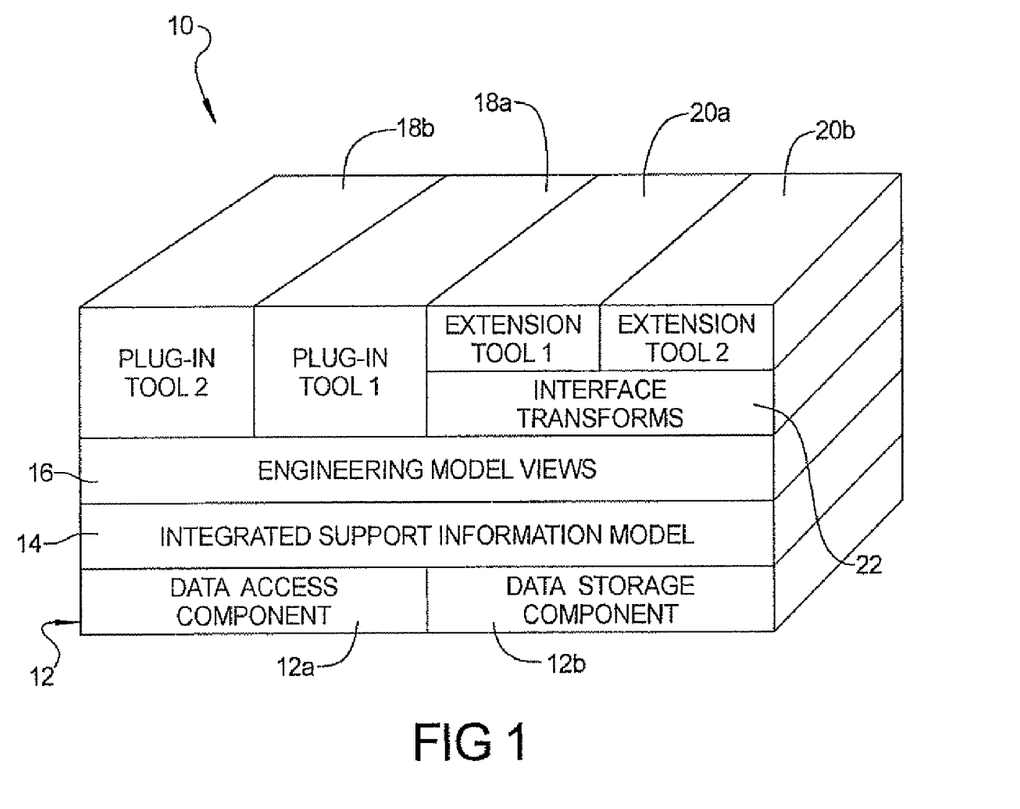
FIG. 1 is a simplified reference architecture diagram illustrating an exemplary reference architecture in accordance with an embodiment of the system of the present disclosure.

Referring to FIG. 1, there is illustrated a reference architecture diagram representing an exemplary architecture for a system 10 in accordance with one embodiment of the present disclosure. At a high level, the system 10 can be viewed as having an architecture that enables a separation of the analytical views of various engineering disciplines from underlying health management data that is useful for each engineering discipline. The system 10 provides a "framework" by which each specific client tool that is accessing the system can publish information to a system database, or can obtain information from the database, in a manner where the information can be properly viewed, analyzed and used by a user working with the specific client tool. The architecture of the system 10 enables each one of a plurality of client tools to publish information to a system database in a manner where the analytical views of the engineering disciplines of the client tools are decoupled (i.e., separated) by the system from their underlying data representations. This enables practical data reuse and the preservation of the meaning of application concepts as they are reused among the client tools. It also facilitates the capture and transmission of underlying data that is needed by a specific client tool to be accessed in a machine processable way. Furthermore, the system 10 allows each of the client tools to view and operate on just the subset of information relevant to the client that may be contained in the system database, while adding to the general information store for the other HM applications that are clients of the system.

Referring further to FIG. 1, the system 10 has an architecture which includes a database 12 having a data access component 12a and a data storage component 12b, an integrated support information model (ISIM) module 14, an engineering model views module 16, one or more plug-in tools 18, and optionally one or more extension tools 20. If one or more extension tools 20 are incorporated, then an interface transform module 22 may also be included.

Each plug-in tool 18a,18b may comprise a computer program that interacts with the system 10 to provide a certain, typically very specific, function on demand. Plug-ins 18a,18b may customize some portion of common data that is stored in the data storage component 12b. The plug-in tools 18 can be viewed as representing "client tools" that enable a user to interface directly with the engineering model views module 16. More specifically, each plug-in tool 18 may operate on some portion of common data, and the common data will be presented to that specific plug-in tool 18 by the engineering model views module 16 in a manner that is required or appropriate for that particular plug-in tool 18. In practice, it is anticipated that a number of plug-in tools 18 may be used with the system 10 to enable a diverse plurality of client tools to publish to and access data from the database 12. It will be appreciated that this is a principal strength and significant feature of the system 10. The system 10 supports the interoperation of numerous analytical applications (e.g., client tools) that operate on a common information domain.

The extension tools 20 are used to customize the behavior of the system 10, but in a somewhat less controlled manner than that accomplished by plug-in tools 18. Whereas plug-in tools 18a,18b are tightly integrated with the system 10 information, extension tools 20 are usually not well integrated and provide somewhat independent functionality. Extension tools 20 are nevertheless useful and may be used in the system 10 because they produce, consume and otherwise modify information relevant to the system 10 common information model and client applications. The principal difference is that plug-ins 18a,18b generally rely on the main application's user interface and have a well defined boundary to their possible set of actions. Extensions tools 20a, 20b generally have fewer restrictions on their actions, and may provide their own user interfaces. Specifically, in the case of the present system 10, plug-ins 18a,18b may be software programs developed by The Boeing Company that are tightly coupled from an interface standpoint with the framework layers (i.e., subsystems 12, 14 and 16) of the present system 10. Extensions, on the other hand, may be software programs designed by third parties. In this case third parties can mean either entities external to The Boeing Company ("Boeing") or entities internal to Boeing who did not design their software component or tool with the framework in mind, that require use of additional interface components or interface transforms 22 in order to participate in the system 10.

The extension tools 20a, 20b are connected to the system 10 through the interface transforms module 22. In practice, each extension tool 20a, 20b will typically require its own unique interface transform for interfacing it to the engineering model views 16 module of the system 10. Each extension tool 20a, 20b enables an associated user to select and use specific tools that satisfy some portion of their health management analytical requirements. The extension tools 20a, 20b may also represent client tools that are operated by the entity that operates the system 10, or they could be client tools from a third party supplier or other remote entity.

The interface transforms module 22 may make use of scripting or higher order languages combined with direct data transfer using simply tagging tools, for example, XML. The interface transforms module 22 may be informed by the semantics of the ISIM module 14. The semantics of the health management domain are represented in the ontology maintained in the ISIM module 14. By "ontology", it is meant a formal, explicit specification of a shared conceptualization.

Given this definition, the implementation of an ontology may take many forms, but most often resembles a data model, or possibly an objected-oriented model, of the terms, concepts, etc., for some information domain. For example, an ontology may consist of a number of machine processable assertions, axioms, and constraints that allow a certain amount of data type, value, integrity, and semantical and syntactic constraints to be evaluated on instances of support model data. Interface transform code can take advantage of the sophistication of the ISIM module 14 in executing transforms of extension tool instance data into occurrences of data understandable by, and suitable for inclusion in, the database 12.

The engineering model views module 16 accepts any request for data from a plug-in module 18 or an extension module 20 (i.e., any client tool). It also publishes data from any plug-in module or extension module to the database 12 by operating on the engineering view representation being used with the specific plug-in module or extension module. The engineering model views module 16 is responsible for presenting the read/write views to the client tools (18,20) and then mapping and translating the request for data as transactions occur between the client tools and the system 10. Given a common model that represents a given information domain, for example, a domain of health management related information, an "engineering view" represents a specific subset of information that is represented in accordance with the concerns/requirements/parameters of a particular client tool (i.e., the subset of information is restricted to the information domain which the client tool may operate with). The engineering views generated by the engineering model views module 16 essentially serve as the syntactic and semantic interface between client tools and the common data being stored in the database 12, and therefore serve as the basis for information services that provide the semantic messages that couple the plug-in tools 18 and the extension tools 20. It will be appreciated that the term "syntax" refers to the way that symbols are put together to have specific meaning to a computer program that is interpreting them. A syntax is essentially a representation of the language rules. The term "semantics" refers to the meaning of the "symbol groups" or tokens that are processed by the computer. The difference between these two terms is the difference between the nature of the expressive form of the symbols to be processed (the syntactical aspect) versus the nature of what meaning is intended by the representation (the semantic aspect).

Since approaches to diagnostic engineering models vary from client tool to client tool, and the heterogeneity of modeling methods typically prohibits easy data interchange between tools, some system and method for modeling information from diverse client tools is required. The ISIM module 14 addresses this issue by providing a subsuming representation of all client engineering views that abstracts client information representations into a common logical model suitable for storage in the database 12. The ISIM module 14 comprises a conceptual representation of all of the information in the health management domain which may be pertinent to the various client tools 18,20. This conceptual representation effectively forms an ontology representing a conceptual vocabulary (defining entities and relations) for representing or defining health management information. The ISIM module 14 accomplishes this by using its ontology to represent and help interpret and map common concepts as represented in the health management client tools 18,20 to an underlying physical storage model (i.e., database 12).

As an example of the requirement for the ISIM module 14, consider two applications A and B, each representing a related aspect of the health management domain, but created at different times by different organizations within somewhat differing contexts. Suppose that there exists a construct in Application A that represents a model entity called "Part" with one or more failure mode attributes. Application B may have a similar construct called a "Component" with one or more fault attributes. It would not be obvious what the degree of similarity may be between the "Part" and the "Component", although there may appear to a correlation. In order for Applications A and B to interoperate correctly and efficiently, it is necessary for the degree of semantic correlation between the "Part" and "Component", and their respective fault attributes, to be sufficiently established. This can be accomplished only by either formal information representation methods agreed to beforehand or by human agreement. This requirement of "interoperability" places a high level demand on the semantic integrity that is provided by software components associated with each of Application A and B, to which semantic concepts can be sufficiently represented and communicated. The semantic nature of the system 10 offers an alternative to verbal or software contracts. The use of a common ontology which maps to specific engineering views associated with each tool provides a means to use semantic mapping technology to map or transform data representations from one conceptual view to another.

With further reference to FIG. 1, the data access component 12*a* allows the client tools 18,20 to store and retrieve data from the data storage component 12*b* without requiring the client tools to manage the details of database connectivity and transaction management. The data storage component 12*b* provides a unified storage mechanism for the information generated by health management trade studies to be performed using the tools 18,20. It is logically disconnected from the client tools 18,20 which use it by the data access component 12*a* but serves as a common repository of accumulated system diagnostic knowledge.

The data access component 12*a* further makes use of data access "objects". The data access objects can be thought of as client components within the system 10 that enable access to persistent data storage. Use of data access objects (DAOs) support the encapsulation of data access logic into a set of specialized components by providing access to data sources through a layer that separates (i.e., decouples) data transactions from other software components. DAO encapsulation eliminates tight coupling between software components. This means that changes to data access functionality, such as moving to different data sources, using different types of drivers, changes the data access logic. Database changes do not impact other software components. This reduces complexity, and code readability and maintainability is improved as well.

The data storage component 12*b* forms a central data repository for users using the system 10. This provides several distinct advantages. For one, models (an individual model or sub-system) can be shared between diagnostic engineers across a network. This increases the potential for collaboration and allows for greater flexibility in how models are built and maintained. In addition, this architecture lends itself to a version-management (VM) approach. VM provides higher levels of data management, such as archiving and rollback capabilities. Besides merely providing a storage repository for the framework elements, the data base 12 becomes an aggregate knowledge repository as the relationships of information across client tools are made explicit, and the whole becomes more than the sum of its parts. The use of the data storage component 12*b* also increases the potential for integration with other applications, services and frameworks. Creating an integrated aggregate repository of health management information will further provide a resource that may be tapped purely as a relational data source by other persons and tools using native relational data access query methods. Such relational data access query methods may be quite outside the literal bounds of the system 10, but serve purely as an enterprise information resource.

One particular consideration in writing or mapping various models to a relational store is in independently tracking and version managing each of the component subsystems. This is accomplished by extracting the relevant hierarchical model data and putting it into flat relational storage. Hierarchical data structures in general are not easily accommodated by flat relational storage mechanisms, so this issue is addressed by designing suitable inter-relations into the schema to support graph structures. This would be accomplished by abstracting the data representation problem to include graph nodes and arcs as data elements to be stored in an integrated fashion with client information. These particular data elements, however, would not be represented in any of the higher layer information representations; they would be invisible to the system 10 users.

The use of a shared database 12 with version management implies that user authentication and authorization is desirable. The database 12 may be constructed to contain a structure or component to support a native authentication mechanism and/or support for a native discrepancy access control (DAC) scheme.

Figure 2:
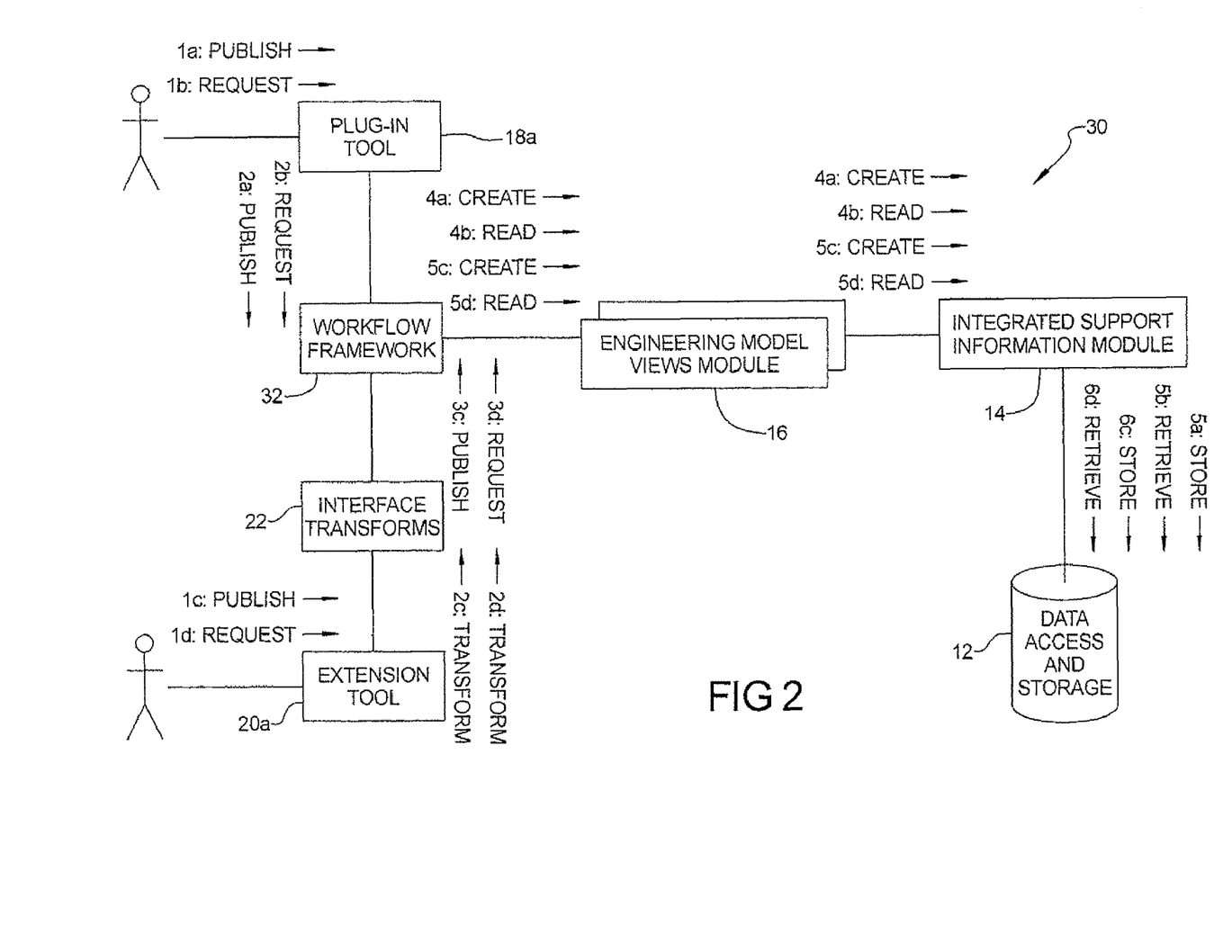
FIG. 2 is a process flow diagram illustrating how users may interact with the system of the present disclosure.

To help further illustrate the operability and capabilities of the system 10, several examples will now be presented. With brief reference to FIG. 2, a simplified diagram is presented of the modules of one embodiment of the system 10 that illustrates diagrammatically how work flows through the system 10. An exemplary component, a workflow framework module 32, is also presented. The workflow framework module 32 may be a software component that assists in orchestrating and ordering the flow of requests and information to and from the users making use of the plug-in tool 18*a* and the extension tool 20*a*. Four distinct communications scenarios will be presented: 1) where plug-in tool 18*a* is publishing information to the system 10; 2) where plug-in tool 18*a* is requesting information; 3) where the extension tool 20*a* is publishing information to the system 10; and 4) where the extension tool 20*a* is requesting information. It will be appreciated that a central feature of the system 10 is providing the services required for multiple client tools to share data and to create, access, analyze, manipulate and store their potentially unique, instantiated views of a common health management information model. The duties and capabilities of the plug-in tool 18*a* and the extension tool 20*a* are "encapsulated" from the system 10 and from each other, with the modeling paradigm of the system 10 acting as the integrating mechanism that allows all client tools to leverage the work performed by the other client tools that are accessing the system 10.

Publishing Plug-In Data to the System 10

Figure 3:
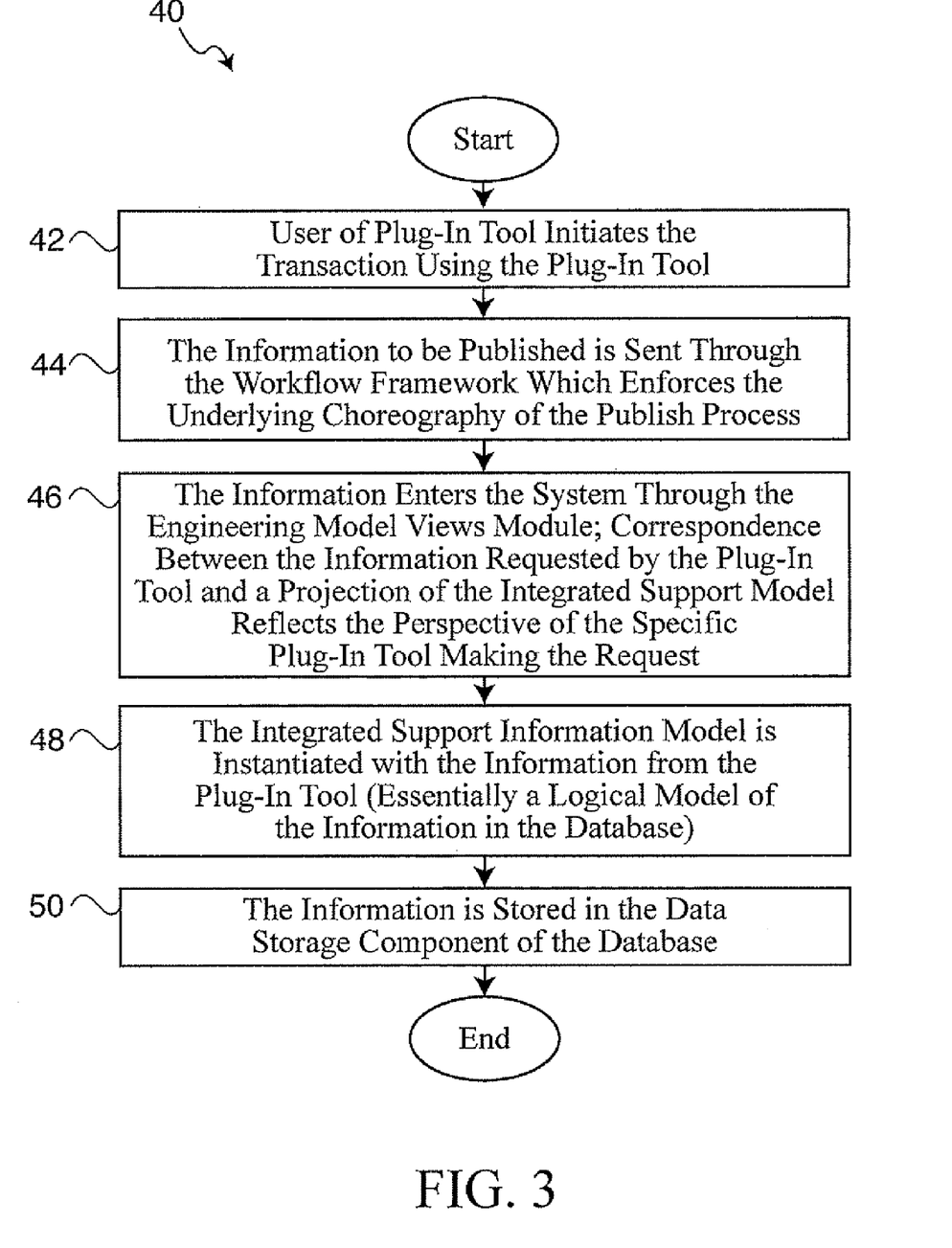
FIG. 3 is a flowchart illustrating the operations of an exemplary procedure by which a plug-in user may publish information to a database of the system.

Referring to FIG. 3, a flowchart 40 is illustrated for explaining a process by which a user of plug-in tool 18*a* wishes to publish information contained within the plug-in tool 18*a* to the system 10. The user first initiates the transaction using the plug-in tool 18*a*, as indicated at operation 42. In operation 44, the information is sent through the system 10 which enforces the underlying choreography of the publishing process, as indicated by operation 44. The choreography can be thought of as a sequence of required operations that can be described by a state machine. A state machine is understood as simply being a program that operates in many different intervals, with each interval being defined as a "state". The behavior of a computer running the program may then be defined by the transitions between the states.

At operation 46, the information enters the system 10 through the engineering model views module 16. There is a correspondence between the information to be published and a projection of the integrated support model (i.e., view) that reflects the perspective of the particular client plug-in 18*a*. This "view" is consistent with all user interactions that are being made through the plug-in tool 18*a* and can also be thought of as "mapping" between the logical representation of the integrated support model being used by the client plug-in 18*a* and the specific representations of those elements of the model, as required by the plug-in tool 18*a*. In operation 48, the ISIM module 14 is instantiated with the information. The resulting information model can be thought of as the "logical model" of the information in the data storage component 12*b* (FIG. 1), but a logical model containing semantic information. In operation 50, the information is written or mapped to the data storage component 12*b* via the data access component 12*a*.

Plug in Tool Requests Information from System 10

Figure 4:
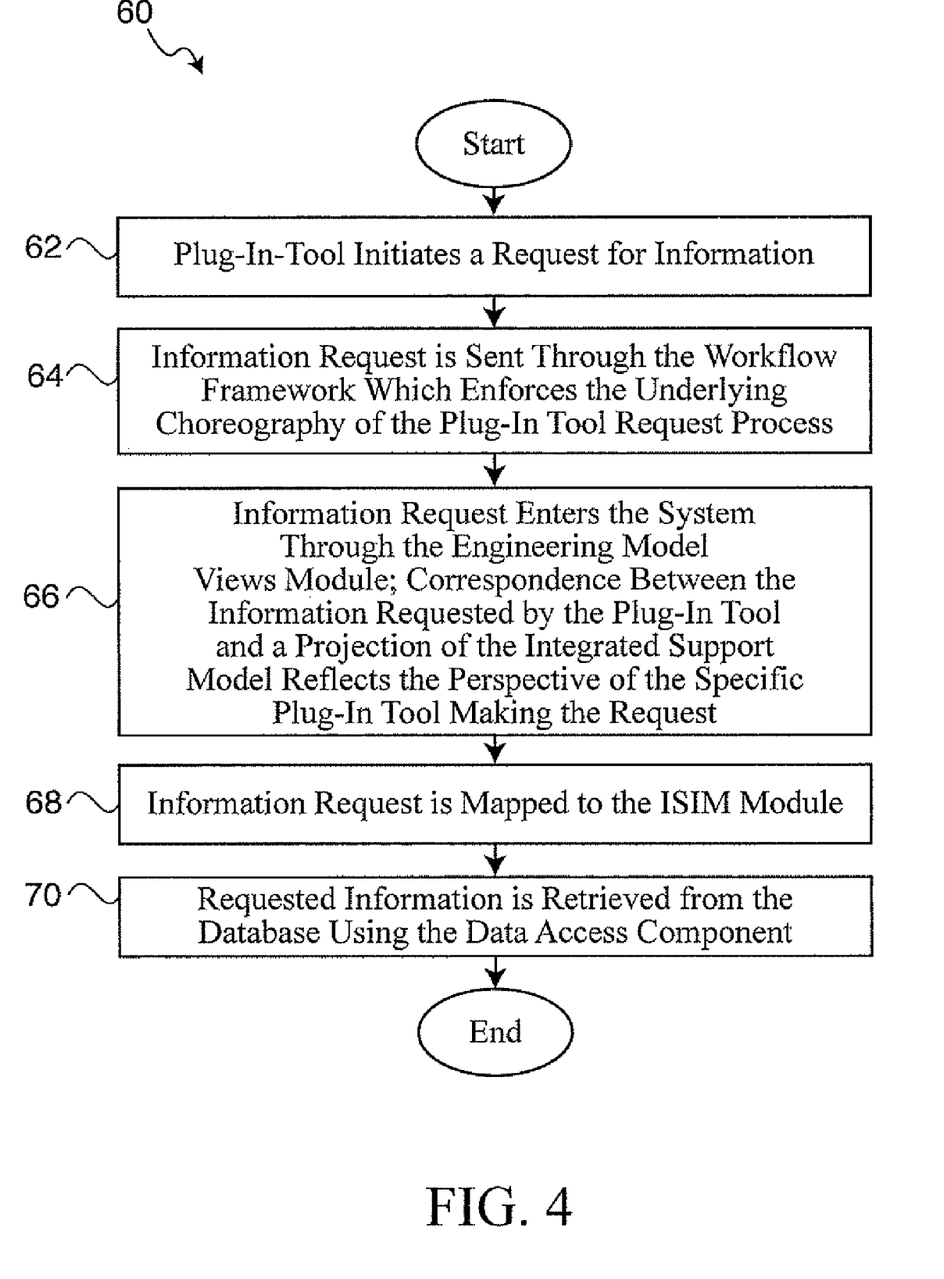
FIG. 4 is a flowchart illustrating the operations of an exemplary procedure by which a plug-in user may request information from the system.

Referring to flowchart 60 of FIG. 4, when a user of the plug-in tool 18*a* wishes to request information contained within the database 12 of the system 10, the request is initiated by the plug-in tool 18*a*, as indicated at operation 62. At operation 64, the information request may be sent through the workflow framework 32, which enforces the underlying choreography of the plug-in request process, as indicated at operation 64. At operation 66, the request enters the system 10 through the engineering model views module 16, as indicated at operation 66. There is a correspondence between the information being requested by the plug-in tool 18*a* and a projection of the integrated support model that reflects the perspective of the particular plug-in tool 18*a* making the request. This view is consistent through all user interactions via the plug-in tool 18*a* and it can also be thought of as a mapping between the logical representations of the integration support model and the specific representations of those elements of the model, as required by the plug-in tool 18*a*. At operation 68, the request is mapped to the ISIM module 14, and then in operation 70 the requested information is retrieved from the data storage component 12*b* and transmitted back to the plug-in tool 18*a*.

Publishing Extension Data to the System 10

Figure 5:
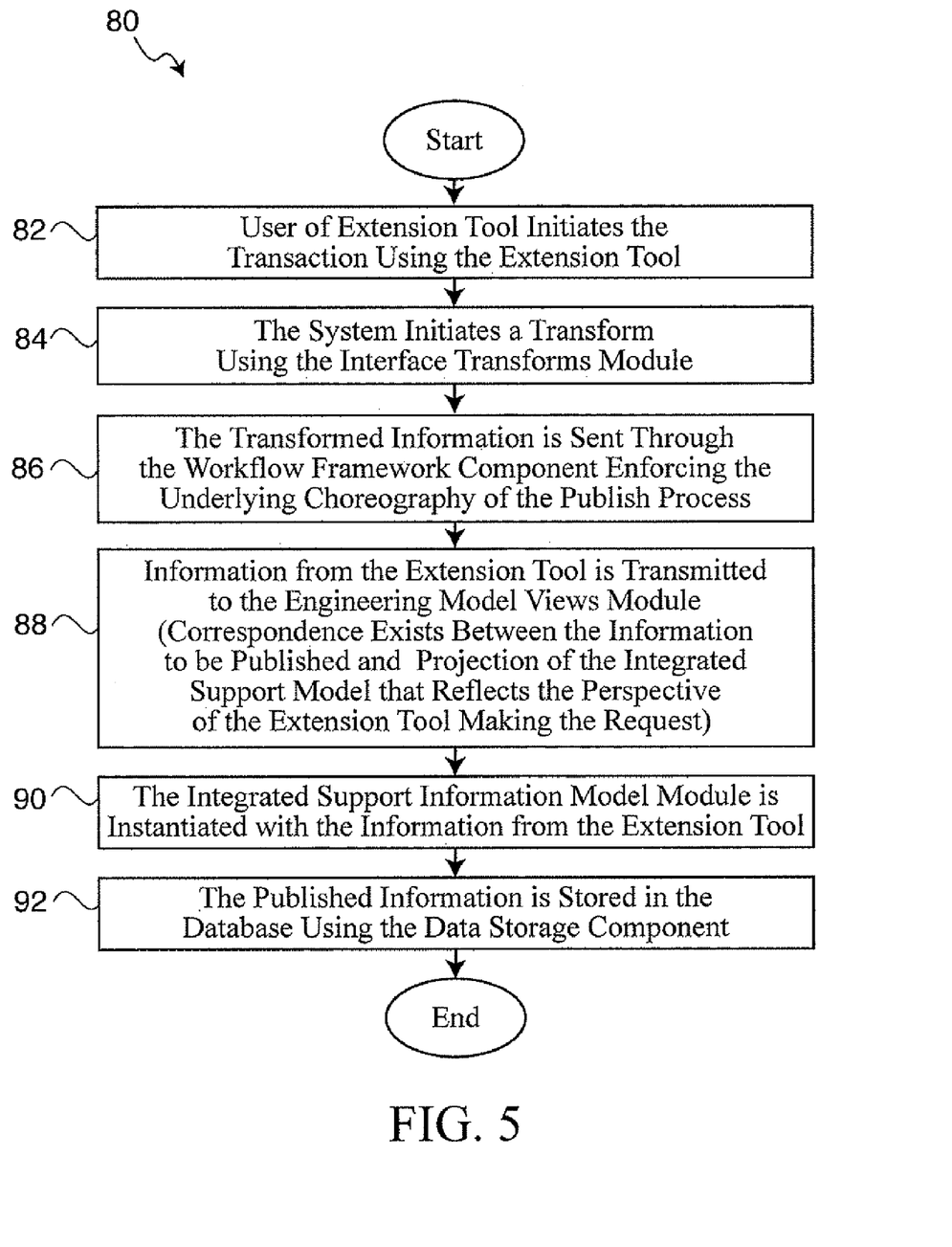
FIG. 5 is a flowchart illustrating the operations of an exemplary procedure by which an extension user may publish information to a database of the system.

Referring to FIG. 5, when a user of the extension tool 20*a* wishes to publish information contained within the extension tool 20*a* to the system 10, the user initiates the transaction using the extension tool 28, as indicated at operation 82. In operation 84, the extension tool 20*a* initiates a transform using the interface transforms module 22, as indicated at operation 84. The precise form that this operation takes will be dependent on the nature of the particular extension tool and data formats that it is capable of exporting. The transform may be implemented using a higher order language, such as C++ or Java, scripting language such as XSLT or Perl, or other more or less sophisticated methodologies. In operation 86, the transformed information is sent from the interface transforms 22 through the workflow framework 32, if this component is included, which again enforces the underlying choreography of the publishing process.

In operation 88, the information enters the engineering model views module 10. There is a correspondence between the information to be published and a projection of the integrated support model that reflects the specific perspective (i.e., view) of the client extension tool 20*a*. This view is consistent through all user actions with the extension tool 20*a*. It can be thought of as mapping between the logical representation of the integrated support model and specific representations of those elements of the support model as required by the extension tool 20a.

In operation 90, the ISIM module 14 is instantiated with the information originating from the extension plug-in 20a. The information model can be thought of as the logical model of the information in the data storage component 12b, but a logical model containing semantic information. In operation 92, the information is stored in the data storage component 12b.

Extension Tool Requests Information from System 10

Figure 6:
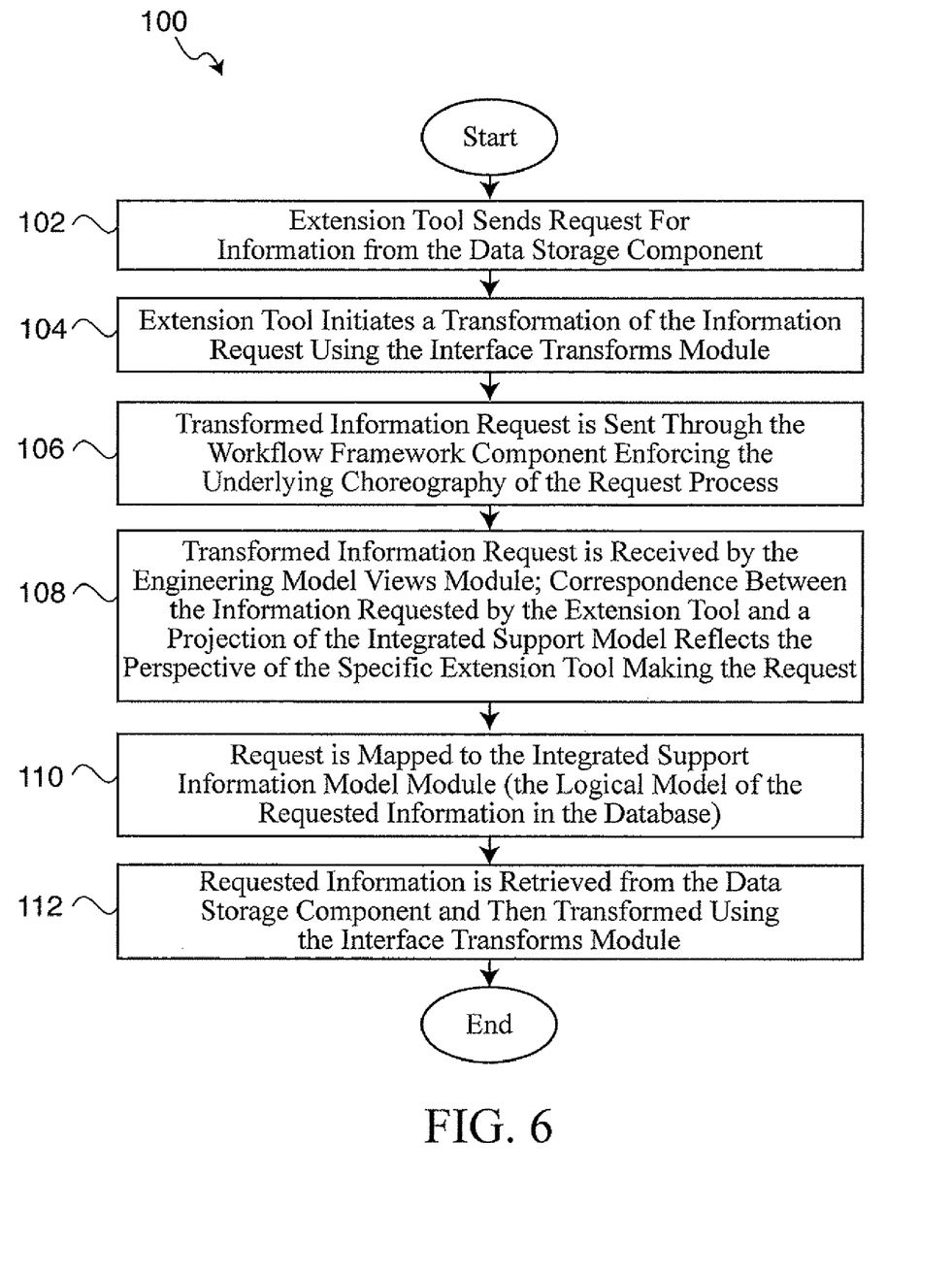
FIG. 6 is a flowchart illustrating the operations of an exemplary procedure by which an extension user may request information from the system.

Referring to FIG. 6, a flowchart 100 is illustrated outlining operations that are performed when the extension tool 20a requests information from the data storage component 12b of the system 10. In operation 102, this sequence is initiated by the extension tool 20a sending a request via the extension tool 20a. In operation 104, the extension tool 20a initiates a transformation of the request using the interface transforms module 22, as indicated at operation 104. The form that this step takes will be dependent on the particular nature of the extension tool 20a and the data formats that it is capable of being used with. Again, the transform provided by the interface transforms module 22 may be implemented using a higher order language such as C++ or Java, scripting language such as XSLT or Perl, or other more or less sophisticated methodologies.

At operation 106, the transformed information request is sent through the workflow framework component 32, which again enforces the underlying choreography of the communication. At operation 108, the information request enters the system 110 through the engineering model views module 16. There is a correspondence between the information requested by the extension tool 28 and a projection of the integrated support model that reflects the particular perspective of the extension tool 20a. This view is consistent through all user interactions using the extension tool 20a and can also be thought of as a mapping between the logical representation of the integrated support model and the specific representations of those elements of the model as needed by the extension tool 20a. At operation 110, the request is mapped to the ISIM module 14. At this stage, the request represents the logical model of the information being requested from the data storage component 12b.

At operation 112, the requested information is retrieved from the data storage component 12b, via the data access component 12a. Again, the form that this operation takes will be dependent on the nature of the particular extension tool being used and the data formats that the particular extension tool is capable of being used with (i.e., the formats with which it is capable of exporting and importing information). The transform may be implemented using a high order or scripting language as described above. Once transformed, the data is accepted by the extension tool 20a.

ADDITIONAL EXAMPLE

When first considering the development of system health management (HM) capabilities, early in the design phase, one might create an initial functional model of the system in order to hypothesize some of the desired HM attributes. So, the user would invoke, for example, plug-in 18a, which may comprise an ADVISE Modeling plug-in, in order to create an initial top down functional model of the system 10 and then populate the system functions with supposed failure rates. One could then use a different plug-in, for example plug-in 18b, which comprises an ADVISE Reliability plug-in, to calculate such system attributes as mission reliability and probability of loss of control.

Further to the above, assume that a user has a favorite diagnostic development tool, for discussion purposes a tool that is named the "ABC" tool that is provided by a supplier external to The Boeing Company. The ABC tool therefore represents an extension to the system 10. The user could use the ABC tool as follows. A suitable transform for data flow between the ABC tool and the system 10 can be developed, so the aspects of the system 10 that are relevant to furthering the physical diagnostic design will be exported to the ABC tool using the transform. Using the ABC tool, an ABC "model" will be developed, and appropriate diagnostic analyses performed, until that portion of the model is built to the satisfaction of the user. It will then be imported back to the system 10 for storage for future use. The future use may be by other plug-ins (e.g., proprietary software programs of The Boeing Company), or by other third party extensions.

While the above is occurring, whenever a model from one of the tools (plug-in or extension) is sent to the system 10, it is stored in the system database 12. Each tool accesses the database 12 and only "sees" the data from the database 12 that is appropriate for it, as managed by the engineering model views module 16. As each plug-in or extension adds to the model, the body of knowledge in the database 12 grows and becomes more valuable (synergistic data growth multiplies the value of information).

The system 10 and method thus provides the ability to allow various disciplines and analytical processes, via various plug-ins and extension tools, to access particular subsets of information stored within the data storage component 12b. The architecture of the system 10 allows additional plug-in tools or additional extension tools to be readily interfaced to the system 10 as needed to meet the changing needs of a particular health management task or operation.

In particular, the system 10 and method provides an information sharing mechanism that enables multiple health management tools to utilize information developed in other client tools. The system 10 also provides a robust framework for adding customizable, analytic behaviors through the creation of new plug-in modules. The system 10 further provides an extendable framework that allows (i.e., supports) the use of tools developed outside of the enterprise where needs may arise.

The system 10 further provides a means to save and aggregate information from multiple engineering analyses, and thus creates a multiplicative effect, from a knowledge standpoint, which in turn serves to create powerful information value chains. Given a set of health management data, the system 10 provides a means for each tool to view a health management modeling perspective reflective of the tool's analytical perspective.

The system 10 further serves as an integration platform for information from multiple sources within and outside the enterprise. The system 10 provides a significant benefit simply from the re-use of engineering data and leveraging of enterprise intellectual capital. The system 10 creates a highly valuable historical resource that can integrate all knowledge about the health management aspects of a system that can be used as a knowledge resource throughout a lifecycle of an engineering artifact.

While various embodiments and methodologies have been described, those skilled in the art will recognize modifications or variations which might be made without departing from the present disclosure. The examples illustrate the various embodiments and methodologies and are not intended to limit the present disclosure. Therefore, the description and claims should be interpreted liberally with only such limitation as is necessary in view of the pertinent prior art.

What is claimed is:

1. A support model integration system for enabling the communication of health management information to and from a client, the system comprising:
   at least one processor;
   a database for holding health management data useable by a plurality of differing clients;
   a plurality of client tools for connecting a plurality of different clients to the system, each one of the client tools being able to at least one of publish information to the database or request information from the database;
   an engineering model views module controlled and executed by the processor in communication with the client tools for providing an interface between each said client tool and said database, the engineering model views module operating to present read and write views to each one of the client tools in accordance with specific view requirements of each said client tool, and further performing mapping and translating on requests for data from the database by each said client tool so that data communicated to each said client tool is presented in accordance with a specific view required by each said client tool;
   and wherein the engineering model views module further publishes data received from each said client tool to the database by operating on an engineering view representation being used with each specific said client tool; and
   an integrated support information model interposed between said data base and said engineering model views module, that forms a logical and semantic specification for implementing a plurality of machine processable axioms and constraints to enable syntactic and semantic constraints relating to be used by each said client tool when accessing said information from said database, and also to be used by said system when processing new information from said client device that needs to be stored in said data base.

2. The system of claim 1, wherein said specification is used to de-couple an analytical view of health management information being presented by each said client tool from data underlying said analytical view.

3. The system of claim 1, wherein at least one of said client tools comprises a plug-in tool that customizes a behavior of the system to meet a specific health management analytical requirement.

4. The system of claim 1, wherein at least one of said client tools comprises an extension tool that customizes a behavior of the system to meet a specific health management analytical requirement.

5. The system of claim 4, further comprising an interface transform for interfacing said extension tool to said engineering model views module.

6. The system of claim 1, wherein at least one of said client tools comprises a plurality of extension tools, and at least one interface transform for interfacing said extension tools to said engineering model views module.

7. A support model integration system for enabling the communication of health management information to and from a database, the system comprising:
   at least one processor;
   a plurality of client tools including at least one plug-in tool for interfacing a client to the system, the client tools each being able to publish information to the database or request information from the database;
   an engineering model views module controlled and executed by the processor in communication with the client tools for providing an interface between each said client tool and an integrated support semantic information model, the engineering model views module operating to present read and write views to each said client tool in accordance with specific view requirements of each said client tool, and further performing mapping and translating on requests for data from the database by one or more of the client tools so that health management data communicated to the one or more client tools is presented to the client tool in accordance with a specific view requirement being used by each said client tool;
   the engineering model views module further adapted to publish data received from each said client tool to the database by operating on an engineering view representation being used with each specific said client tool; and
   the integrated support information model being interposed between said data base and said engineering model views module, and being adapted to implement a plurality of machine processable axioms and constraints to enable syntactic and semantic constraints relating to health domain information available for use by said client tool via said system to be used when presenting said health domain information to said client device, and also to be used by said system in processing new information received from said client tool for storage in said database in said database.

8. The system of claim 7, further comprising an extension tool interfaced to said engineering model views module.

9. The system of claim 8, further comprising an interface transform for interfacing said extension tool to said engineering model views module.

10. The system of claim 7, wherein said client tools comprise a plurality of independent plug-in modules interfaced to said engineering model views module.

11. The system of claim 7, wherein said client tools comprises a plurality of extension modules interfaced to said engineering model views module.

12. A method for forming a support model integration system for enabling the sharing of health management data between a plurality of diverse client tools, the method comprising:
   providing a plurality of differing client tools;
   forming a database for holding health management data useable by each of said client tools;
   forming an interface between each said client tool and said database, so that data communicated to each said client tool from said data base is presented in accordance with a specific framework being used by each said client tool;
   the forming an interface between each said client tool and said database including using an engineering model views module that operates to present one of a plurality of different available read and write views to the client tools in accordance with specific view requirements of each said client tool, and which further operates to perform mapping and translating on requests for data from the database by each said client tool so that health management data communicated to each said client tool is presented to each said client tool in accordance with a specific view requirement being used by each said client tool;
   further causing the engineering model views module to publish data received from each said client tool to the database by operating on an engineering view representation being used with each specific said client tool;
   forming an integrated support information model to communicate with said interface and said data base, that forms a specification for implementing a plurality of machine processable axioms and constraints to enable syntactic and semantic constraints relating to health domain information available for use by each said client tool, and for using said constrains on information received from each said client device.

13. The method of claim 12, wherein the operation of forming an integrated support information model comprises forming a model that obtains engineering attributes from underlying health management data being presented by each said client module, to enable said underlying health management data to be stored in said database.

14. The method of claim 12, wherein forming a database with information usable by each of said client tools comprises using a database with information usable by a plurality of extension tools.

15. The method of claim 12, wherein forming a database with information usable by each of said client tools comprises using a database with information usable by a plurality of plug-in tools.

* * * * *